US011676609B2

(12) United States Patent
Li et al.

(10) Patent No.: US 11,676,609 B2
(45) Date of Patent: Jun. 13, 2023

(54) SPEAKER RECOGNITION METHOD, ELECTRONIC DEVICE, AND STORAGE MEDIUM

(71) Applicant: BEIJING CENTURY TAL EDUCATION TECHNOLOGY CO., LTD., Beijing (CN)

(72) Inventors: Hang Li, Beijing (CN); Wenbiao Ding, Beijing (CN); Zitao Liu, Beijing (CN)

(73) Assignee: Beijing Century Tal Education Technology Co. Ltd.

( * ) Notice: Subject to any disclaimer, the term of this patent is extended or adjusted under 35 U.S.C. 154(b) by 0 days.

(21) Appl. No.: 18/069,272

(22) Filed: Dec. 20, 2022

(65) Prior Publication Data
US 2023/0130253 A1   Apr. 27, 2023

Related U.S. Application Data

(63) Continuation of application No. PCT/CN2021/104600, filed on Jul. 5, 2021.

(30) Foreign Application Priority Data

Jul. 6, 2020 (CN) .......................... 202010641026.X

(51) Int. Cl.
*G06N 3/08* (2023.01)
*G10L 17/18* (2013.01)
(Continued)

(52) U.S. Cl.
CPC .............. *G10L 17/18* (2013.01); *G10L 15/02* (2013.01); *G10L 17/02* (2013.01)

(58) Field of Classification Search
CPC .......... G06N 3/08; G06N 3/045; G06N 20/00; G06F 16/24526; G06F 21/32;
(Continued)

(56) References Cited

U.S. PATENT DOCUMENTS 11,580,145 B1 *   2/2023   Kumar ................... G10L 15/22
2018/0374486 A1  12/2018   Zhao et al.
(Continued)

FOREIGN PATENT DOCUMENTS

CN        109243467 A        1/2019
CN        109543009 A        3/2019
(Continued)

OTHER PUBLICATIONS

PCT international search report of PCT/CN2021/104600 dated Sep. 17, 2021.
(Continued)

*Primary Examiner* — Jakieda R Jackson
(74) *Attorney, Agent, or Firm* — Emerson, Thomson & Bennett, LLC; Roger D. Emerson; Peter R. Detorre

(57) ABSTRACT

The present disclosure provides a speaker recognition method, an electronic device, and a storage medium. An implementation includes: segmenting the target audio file and the to-be-recognized audio file into a plurality of audio units respectively; extracting an audio feature from each of the audio units to obtain an audio feature sequence of the target audio file and an audio feature sequence of the to-be-recognized audio file; performing feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file; and recognizing, by using an attention mechanism-based machine learning model, the audio units belonging to the target speaker in the to-be-recognized audio file based on the feature vectors.

20 Claims, 8 Drawing Sheets

(51) Int. Cl.
*G10L 15/02* (2006.01)
*G10L 17/02* (2013.01)

(58) Field of Classification Search
CPC ......... G10L 15/16; G10L 25/30; G10L 15/22;
G10L 17/00; G10L 2015/223; G10L
17/18; G10L 15/02; G10L 17/02
See application file for complete search history.

(56) References Cited

U.S. PATENT DOCUMENTS

| | | | |
|---|---|---|---|
| 2020/0043508 A1* | 2/2020 | Song | G10L 25/30 |
| 2020/0294508 A1* | 9/2020 | Kwasiborski | G10L 17/00 |
| 2021/0012902 A1* | 1/2021 | Chawla | G06F 18/24133 |

FOREIGN PATENT DOCUMENTS

| | | |
|---|---|---|
| CN | 110211594 A | 9/2019 |
| CN | 110556114 A | 12/2019 |
| CN | 110634489 A | 12/2019 |
| CN | 110675891 A | 1/2020 |
| CN | 110781680 A | 2/2020 |
| CN | 110910891 A | 3/2020 |
| CN | 111143604 A | 5/2020 |
| CN | 111145760 A | 5/2020 |
| CN | 111370003 A | 7/2020 |
| CN | 111785287 A | 10/2020 |

OTHER PUBLICATIONS

The first office action of Chinese application No. 202010641026.X dated Jan. 19, 2022.

* cited by examiner

SPEAKER RECOGNITION METHOD, ELECTRONIC DEVICE, AND STORAGE MEDIUM

CROSS REFERENCE TO RELATED APPLICATIONS

The present disclosure is a continuation of international application No. PCT/CN2021/104600 filed on Jul. 5, 2021, which claims priority to "Chinese Patent Application No. 202010641026.X filed on Jul. 6, 2020 and entitled "SPEAKER RECOGNITION METHOD AND APPARATUS, ELECTRONIC DEVICE, AND STORAGE MEDIUM", the disclosure of which is hereby incorporated by reference in its entirety.

TECHNICAL FIELD

The present disclosure relates to the technical field of voice recognition, in particular to a speaker recognition method, an electronic device, and a storage medium.

BACKGROUND

Speaker recognition is a technology to identify a speaker by audio features. The existing speaker recognition method roughly uses an encoder model to encode a target audio file and a to-be-recognized audio file, and then compares the similarity between encoded vectors to determine a target detection result. Most of the used encoder models are common deep neural network models, such as a Convolutional Neural Network (CNN), or a Recurrent Neural Network (RNN).

Taking an application scenario of classroom quality evaluation as an example, the number of times a teacher and students speak and a duration of interaction between the teacher and the students are considered as important indicators to evaluate classroom quality. Through speaker recognition technology, respective speaking time of the teacher and the students in the classroom can be accurately marked on a classroom time axis, and thus accurate statistics on the number of times the teacher and the students speak and the duration are obtained. However, features extracted by existing methods are weak in representation ability, and the accuracy of speaker recognition results is low.

SUMMARY

Embodiments of the present disclosure provide a speaker recognition method and apparatus, an electronic device, and a storage medium to solve the problems existing in related technologies. Technical solutions are as follows.

In a first aspect, an embodiment of the present disclosure provides a speaker recognition method, including:

obtaining a target audio file and a to-be-recognized audio file, the target audio file including an audio of a target speaker;

segmenting the target audio file and the to-be-recognized audio file into a plurality of audio units respectively;

extracting a corresponding audio feature from each of the audio units to obtain an audio feature sequence of the target audio file and an audio feature sequence of the to-be-recognized audio file;

performing feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file; and recognizing, by using an attention mechanism-based machine learning model, the audio units belonging to the target speaker in the to-be-recognized audio file, based on the feature vector corresponding to the target audio file and the feature vectors respectively corresponding to the plurality of audio units in the to-be-recognized audio file.

In an embodiment, the step of performing feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file includes:

performing feature learning on the audio feature sequence of the target audio file by using a first neural network in the Siamese neural network, to obtain the feature vector corresponding to the target audio file; and performing feature learning on the audio feature sequence of the to-be-recognized audio file by using a second neural network in the Siamese neural network, to obtain the feature vectors respectively corresponding to the plurality of audio units in the to-be-recognized audio file.

In an embodiment, the first neural network or the second neural network includes at least one of the following: a deep neural network, a gated recurrent unit GRU-based bi-directional recurrent neural network, a long short-term memory LSTM-based bi-directional recurrent neural network, or a self-attention module-based sequence encoding network.

In an embodiment, the step of performing feature learning on the audio feature sequence of the to-be-recognized audio file by using a second neural network in the Siamese neural network, to obtain the feature vectors respectively corresponding to the plurality of audio units in the to-be-recognized audio file includes:

calculating, for a current audio unit of the to-be-recognized audio file, a similarity between the audio feature of the current audio unit and the audio feature of each audio unit in the to-be-recognized audio file respectively, and taking the similarity as a weight of each audio unit relative to the current audio unit; and performing, according to the weight of each audio unit relative to the current audio unit, weighted summation on the audio features corresponding to all the audio units in the audio feature sequence of the to-be-recognized audio file to obtain a feature vector corresponding to the current audio unit.

In an embodiment, the step of performing feature learning on the audio feature sequence of the target audio file by using a first neural network in the Siamese neural network, to obtain the feature vector corresponding to the target audio file includes:

calculating, for the current audio unit of the target audio file, a similarity between the audio features of the current audio unit and the audio feature of each the audio unit in the target audio file respectively, and taking the similarity as a weight of each audio unit relative to the current audio unit;

performing, according to the weight of each audio unit relative to the current audio unit, weighted summation on the audio features corresponding to all the audio units in the audio feature sequence of the target audio file to obtain a feature vector corresponding to the current audio unit; and performing a mean pooling operation on the feature vectors corresponding to all the audio units in the target audio file to obtain the feature vector corresponding to the target audio file.

In an embodiment, the step of recognizing, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file, includes:

calculating an attention score of each audio unit in the to-be-recognized audio file based on the feature vector corresponding to the target audio file and the feature vector corresponding to each audio unit in the to-be-recognized audio file; and determining, when the attention score is greater than or equal to a preset discrimination threshold, that the audio unit corresponding to the attention score in the to-be-recognized audio file belong to the target speaker.

In an embodiment, the step of calculating an attention score of each audio unit in the to-be-recognized audio file based on the feature vector corresponding to the target audio file and the feature vector corresponding to each audio unit in the to-be-recognized audio file includes:

taking the feature vector corresponding to the target audio file as a query vector, taking the feature vector corresponding to each audio unit in the to-be-recognized audio file as a key vector, and calculating an inner product of the query vector and the key vector; and normalizing the inner product corresponding to each audio unit in the to-be-recognized audio file by using a sigmoid function, to obtain the attention score of each audio unit in the to-be-recognized audio file.

In an embodiment, the segmenting the target audio file and the to-be-recognized audio file into a plurality of audio units respectively includes:

removing silence segments from the target audio file and the to-be-recognized audio file by using a voice activity detection model; and segmenting the target audio file and the to-be-recognized audio file from which the silence segments are removed into the plurality of audio units respectively.

In an embodiment, the extracting a corresponding audio feature from each of the audio units to obtain an audio feature sequence of the target audio file and an audio feature sequence of the to-be-recognized audio file includes:

extracting a corresponding audio feature of each of the audio units by using a voiceprint encoding model; and for the target audio file and the to-be-recognized audio file respectively, arranging the audio features in chronological order to obtain the audio feature sequence of the target audio file and the audio feature sequence of the to-be-recognized audio file.

In an embodiment, the method further includes:

connecting the audio units belonging to the target speaker that are continuous in time in the to-be-recognized audio file to obtain at least one speaking time period belonging to the target speaker.

In a second aspect, an embodiment of the present disclosure provides a speaker recognition apparatus, including:

an obtaining module, configured to obtain a target audio file and a to-be-recognized audio file, the target audio file including an audio of a target speaker;

a segmentation module, configured to segment the target audio file and the to-be-recognized audio file into a plurality of audio units respectively;

an extraction module, configured to extract a corresponding audio feature from each of the audio units to obtain an audio feature sequence of the target audio file and an audio feature sequence of the to-be-recognized audio file;

a learning module, configured to perform feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file; and a recognition module, configured to recognize, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file.

In an embodiment, the learning module includes:

a first learning submodule, configured to perform feature learning on the audio feature sequence of the target audio file by using a first neural network in the Siamese neural network, to obtain the feature vector corresponding to the target audio file; and a second learning submodule, configured to perform feature learning on the audio feature sequence of the to-be-recognized audio file by using a second neural network in the Siamese neural network, to obtain the feature vectors respectively corresponding to the plurality of audio units in the to-be-recognized audio file.

In an embodiment, the first neural network or the second neural network includes at least one of the following: a deep neural network, a gated recurrent unit GRU-based bi-directional recurrent neural network, a long short-term memory LSTM-based bi-directional recurrent neural network, or a self-attention module-based sequence encoding network.

In an embodiment, the second learning submodule is specifically configured to:

calculate, for the current audio unit of the to-be-recognized audio file, a similarity between the audio feature of the current audio unit and the audio feature of each audio unit in the to-be-recognized audio file respectively, and take the similarity as a weight of each audio unit relative to the current audio unit; and perform, according to the weight of each audio unit relative to the current audio unit, weighted summation on the audio features corresponding to all the audio units in the audio feature sequence of the to-be-recognized audio file to obtain a feature vector corresponding to the current audio unit.

In an embodiment, the first learning submodule is specifically configured to:

calculate, for the current audio unit of the target audio file, a similarity between the audio feature of the current audio unit and the audio feature of each audio unit in the target audio file respectively, and take the similarity as a weight of each audio unit relative to the current audio unit;

perform, according to the weight of each audio unit relative to the current audio unit, weighted summation on the audio features corresponding to all the audio units in the audio feature sequence of the target audio file to obtain a feature vector corresponding to the current audio unit; and perform a mean pooling operation on the feature vectors corresponding to all the audio units in the target audio file to obtain the feature vector corresponding to the target audio file.

In an embodiment, the recognition module includes:

a calculation submodule, configured to calculate an attention score of each audio unit in the to-be-recognized audio file based on the feature vector corresponding to the target audio file and the feature vector corresponding to each audio unit in the to-be-recognized audio file; and a determination submodule, configured to determine, when the attention score is greater than or equal to a preset discrimination threshold, that the audio unit corresponding to the attention score in the to-be-recognized audio file belong to the target speaker.

In an embodiment, the calculation submodule is specifically configured to:

take the feature vector corresponding to the target audio file as a query vector, take the feature vector corresponding to each audio unit in the to-be-recognized audio file as a key vector, and calculate an inner product of the query vector and the key vector; and normalize the inner product corresponding to each audio unit in the to-be-recognized audio file by using a sigmoid function, to obtain the attention score of each audio unit in the to-be-recognized audio file.

In an embodiment, the segmentation module includes:

a removal submodule, configured to remove silence segments from the target audio file and the to-be-recognized audio file by using a voice activity detection model; and a segmentation submodule, configured to segment the target audio file and the to-be-recognized audio file from which the silence segments are removed into the plurality of audio units respectively.

In an embodiment, the extraction module includes:

an extraction submodule, configured to extract a corresponding audio feature of each of the audio units by using a voiceprint encoding model; and an arrangement submodule, configured to arrange, respectively for the target audio file and the to-be-recognized audio file, the audio features in chronological order to obtain the audio feature sequence of the target audio file and the audio feature sequence of the to-be-recognized audio file.

In an embodiment, the apparatus further includes:

a connection module, configured to connect the audio units belonging to the target speaker that are continuous in time in the to-be-recognized audio file to obtain at least one speaking time period belonging to the target speaker.

In a third aspect, an embodiment of the present disclosure provides an electronic device, the device including a memory and a processor. The memory and the processor communicate with each other through an internal connection path, the memory is configured to store instructions, the processor is configured to execute the instructions stored in the memory, and when the processor executes the instructions stored in the memory, the processor executes the method in any embodiment of the foregoing aspects.

In a fourth aspect, an embodiment of the present disclosure provides a computer-readable storage medium storing a computer program. When the computer program is run on a computer, the method in any embodiment of the foregoing aspects is executed.

The advantages or beneficial effects of the foregoing technical solutions at least include: feature learning is performed on audio feature sequences of audio files by using Siamese neural network in the embodiments of the present disclosures, which can make full use of continuous information of front and back voice signals in a long audio file to help a model to obtain more accurate recognition results, and on this basis, a speaker role determination structure based on attention score is used to further improve the accuracy of speaker recognition.

The foregoing summary is for the purpose of specification only and is not intended to provide limitations in any way. In addition to the illustrative aspects, embodiments and features described above, further aspects, embodiments and features of the present disclosure will be readily understood by reference to the accompanying drawings and the following detailed description.

BRIEF DESCRIPTION OF THE DRAWINGS

In the drawings, like reference numerals throughout a plurality of drawings denote like or similar parts or elements, unless otherwise specified. These drawings are not necessarily drawn to scale. It should be understood that these drawings depict only some embodiments disclosed according to the present disclosure and should not be construed as limiting the scope of the present disclosure.

DETAILED DESCRIPTION

Hereinafter, only some exemplary embodiments are briefly described. As will be recognized by those skilled in the art, the described embodiments may be modified in a variety of different ways without departing from the spirit or scope of the present disclosure. Therefore, the drawings and description are considered to be exemplary in nature and not limiting.

Figure 1:
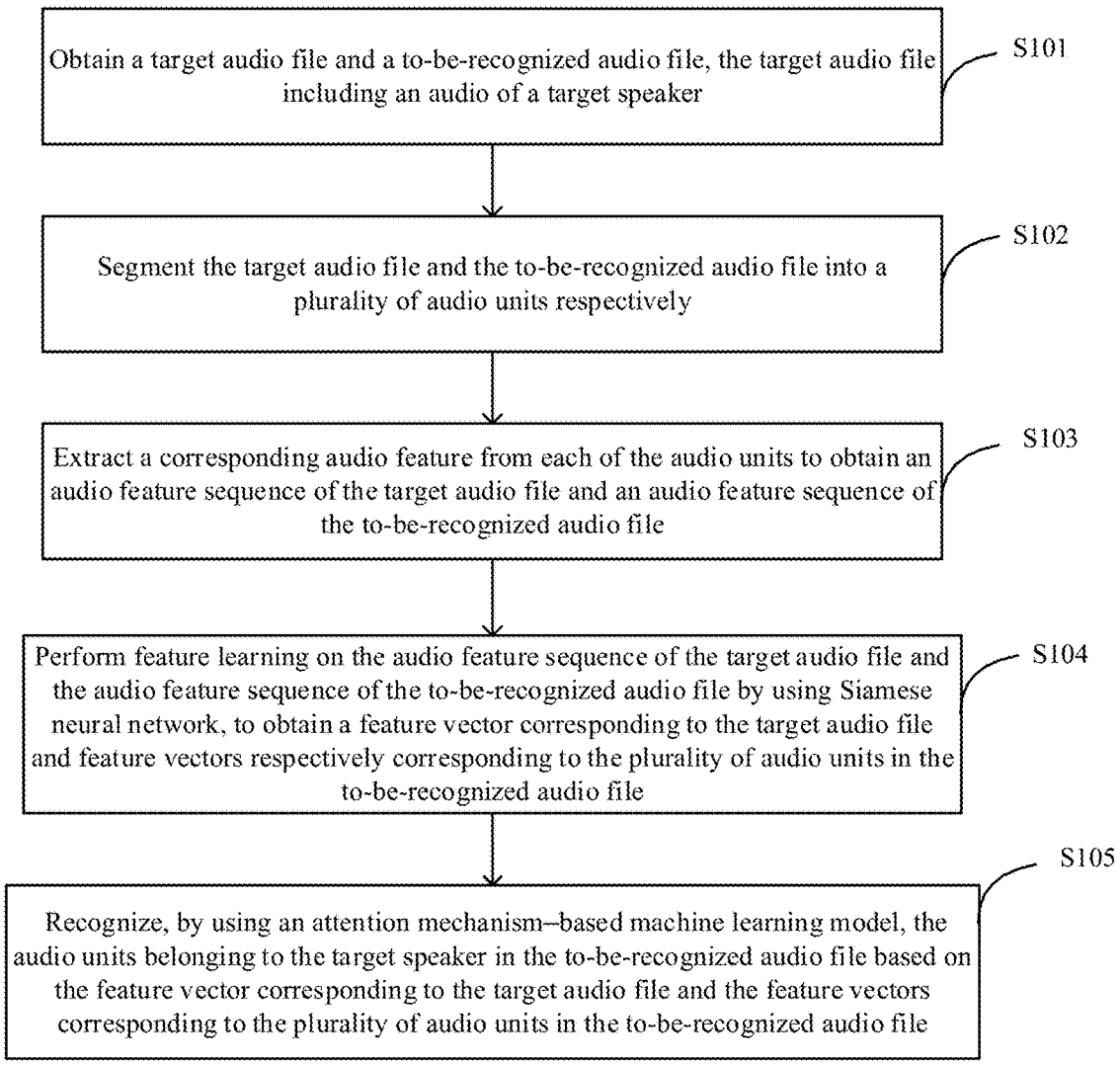
FIG. 1 is a flow chart of a speaker recognition method according to an embodiment of the present disclosure.

FIG. 1 is a flow chart of a speaker recognition method according to an embodiment of the present disclosure. As shown in FIG. 1, the speaker recognition method may include:

Step S101: Obtain a target audio file and a to-be-recognized audio file, the target audio file including an audio of a target speaker;

Step S102: Segment the target audio file and the to-be-recognized audio file into a plurality of audio units respectively;

Step S103: Extract a corresponding audio feature from each of the audio units to obtain an audio feature sequence of the target audio file and an audio feature sequence of the to-be-recognized audio file;

Step S104: Perform feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file; and Step S105: Recognize, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file.

The Siamese neural network may be composed of two neural networks with the same network structure and shared weights. The two neural networks map their inputs to new spaces respectively to form representations of input information in the new spaces and transform the input information into vectors. A traditional speaker recognition method usually compares codes of each segment of an audio file one by one. Such comparison method loses sequential information of front and back segments of the audio file. The traditional method has the following technical defects.

(1) When a target audio file is encoded, the target audio file is usually cut into small segments with equal time length, and then an average of each small segment is taken as an encoding result of the target audio file. This segment averaging method will weaken the representation ability of features and have a negative impact on subsequent similarity calculation.

(2) When a to-be-recognized audio file is processed, the audio is also segmented into small segments with equal length, and then encoding results of each small segment and the target audio file are compared one by one. Such comparison loses sequential information of front and back segments of the to-be-recognized audio file, and therefore, also has a certain negative impact on the subsequent similarity calculation.

In the embodiment of the present disclosure, feature learning is performed on the audio feature sequence of the target audio file and the audio feature sequence of the to-be-recognized audio file by using the Siamese neural network, which can make full use of continuous information of front and back voice signals in a long audio file to help a model obtain more accurate recognition results.

Taking an application scenario of classroom quality evaluation as an example, it can be recognized through speaker recognition technology whether each of the audio units in a classroom recording belongs to a teacher, and respective speaking time of the teacher and students in a classroom is accurately marked on a classroom time axis, and thus accurate statistics on the number of times the teacher and the students speak and the duration are obtained.

Figure 2:
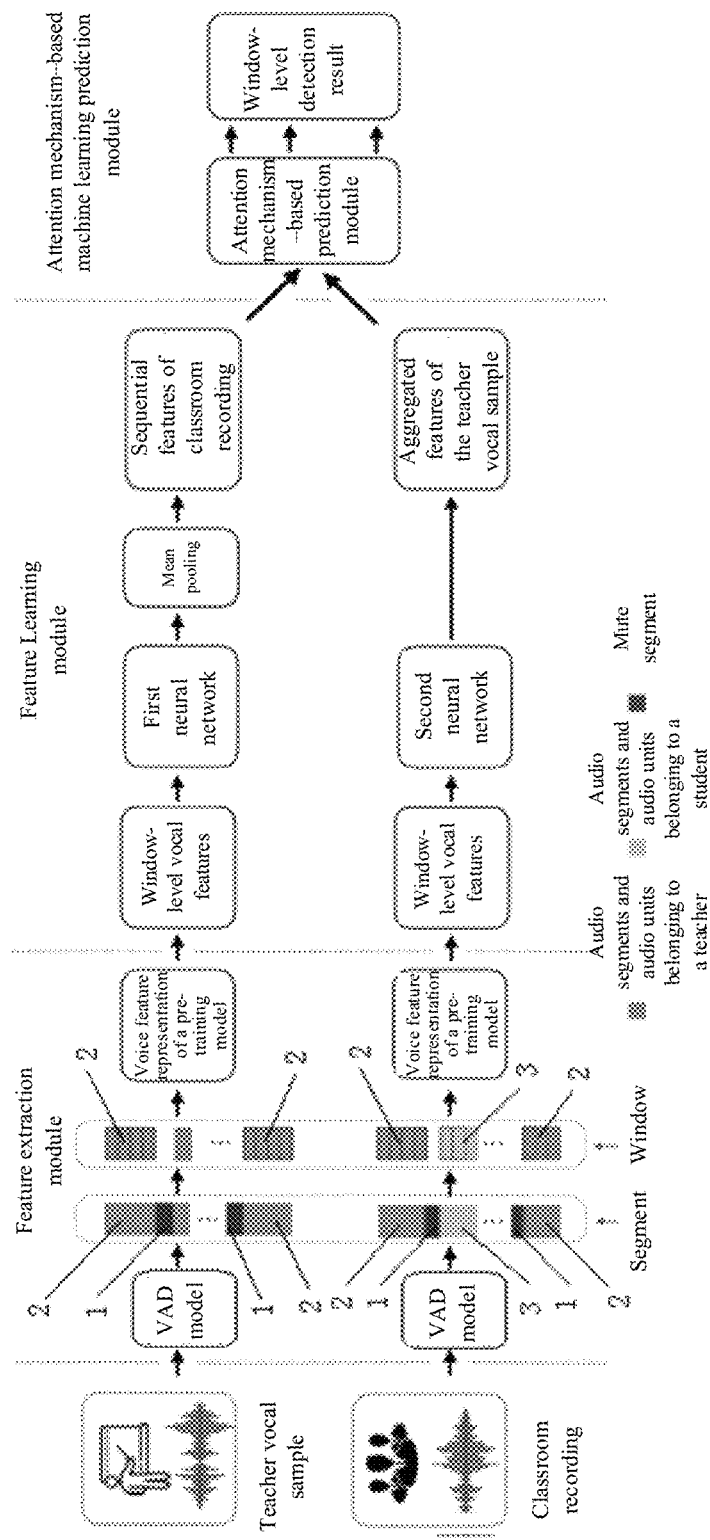
FIG. 2 is a flow chart of a speaker recognition method according to another embodiment of the present disclosure.

Still taking the application scenario of classroom quality evaluation as an example, a target audio file and a to-be-recognized audio file are obtained in step S101. The target speaker may be a teacher. A recording of teacher' speech on any occasion can be pre-recorded as the target audio file. With reference to FIG. 2, a teacher vocal sample (Teacher Vocal Sample) represents the target audio file. A classroom recording may be used as the to-be-recognized audio file. With reference to FIG. 2, the classroom recording (Classroom Recording) represents the to-be-recognized audio file. In step S102, the teacher vocal sample as the target audio file and the classroom recording as the to-be-recognized audio file may be segmented into a plurality of audio units respectively by using preset sliding windows with a fixed length.

In an embodiment, the segmenting the target audio file and the to-be-recognized audio file into a plurality of audio units respectively in step S102 of FIG. 1 may specifically include:

removing silence segments from the target audio file and the to-be-recognized audio file by using a voice activity detection model; and segmenting the target audio file and the to-be-recognized audio file from which the silence segments are removed into the plurality of audio units respectively.

With reference to the example of FIG. 2, in step S102, the teacher vocal sample and the classroom recording may be input into a feature extraction (Feature Extraction) module. In the feature extraction module, the teacher vocal sample and the classroom recording are first input into a VAD (Voice Activity Detection) model, and silence segments are removed from the teacher vocal sample and the classroom recording by using the voice activity detection model, to obtain respective audio segments in the two types of input audios. VAD is also called voice interval detection, voice endpoint detection or voice boundary detection. VAD can identify and eliminate long silence periods from the sound signal stream.

Among the segments (Segments) shown in FIG. 2, the audio segments numbered 1 represent silence segments (no voice or noise). Windows in FIG. 2 represent preset sliding windows. As shown in FIG. 2, each audio segment is segmented into smaller audio units by using a fixed-length sliding window for the audio segments from which the silence segments are removed in the teacher vocal sample and the classroom recording. The reference number 2 represents audio segments and audio units of a sound role belonging to a teacher (teacher talk). The reference number 3 represents audio segments and audio units of a sound role belonging to students (student talk).

In an embodiment, the extracting a corresponding audio feature from each of the audio units to obtain an audio feature sequence of the target audio file and an audio feature sequence of the to-be-recognized audio file in step S103 of FIG. 1 may specifically include:

extracting a corresponding audio feature of each of the audio unit by using a voiceprint encoding model; and arranging, respectively for the target audio file and the to-be-recognized audio file, the audio features in chronological order to obtain the audio feature sequence of the target audio file and the audio feature sequence of the to-be-recognized audio file.

With reference to the example of FIG. 2, in step S103, a corresponding audio feature of each of the audio units is extracted by using a pre-trained voiceprint encoding model.

In an example, the dimensions of the audio feature may be 64 dimensions. After the audio feature of each of the audio units is obtained, these audio features are arranged in chronological order of their appearance, to obtain the audio feature sequence of the teacher vocal sample and the audio feature sequence of the classroom recording respectively. The voice feature representation of the pre-training model (Pre-train Voice Reps.) in FIG. 2 represents output results of the feature extraction module.

In an embodiment, the performing feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file in step S104 of FIG. 1 may specifically include:

performing feature learning on the audio feature sequence of the target audio file by using a first neural network in the Siamese neural network, to obtain the feature vector corresponding to the target audio file; and performing feature learning on the audio feature sequence of the to-be-recognized audio file by using a second neural network in the Siamese neural network, to obtain the feature vectors respectively corresponding to the plurality of audio units in the to-be-recognized audio file.

The Siamese neural network in the embodiment of the present disclosure may include a first neural network and a second neural network. Input information of the first neural network and input information of the second neural network are respectively the audio feature sequence of the target audio file and the audio feature sequence of the to-be-recognized audio file. In an example, the audio feature sequence is comprised of corresponding audio features of the audio units arranged in chronological order. The second neural network obtains an output result for each of the audio unit in the to-be-recognized audio file, where the output result is a feature vector corresponding to each of the plurality of audio units in the to-be-recognized audio file. The first neural network learns the overall feature of the target audio file to obtain an output result, where the output result is the feature vector corresponding to the target audio file.

In an embodiment, the first neural network or the second neural network includes at least one of the following: a deep neural network, a gated recurrent unit GRU (Gated Recurrent Unit)-based bi-directional recurrent neural network, a long short-term memory LSTM (Long Short-Term Memory)-based bi-directional recurrent neural network, or a self-attention module-based sequence encoding network.

With reference to the example of FIG. 2, in the feature learning module (Representation Learning) of FIG. 2, window-level vocal features (Window-Level Vocal Reps.) from the teacher vocal sample and the classroom recording are respectively input into the first neural network and the second neural network of the Siamese neural network. As shown in FIG. 2, the first neural network or the second neural network includes at least one of the following: a Deep Neural Network (DNN), a Bi-directional Gated Recurrent Unit (BiGRU), a Bi-directional LSTM (BiLSTM), or self-attention module-based sequence encoding network (Transformer).

Figure 3:
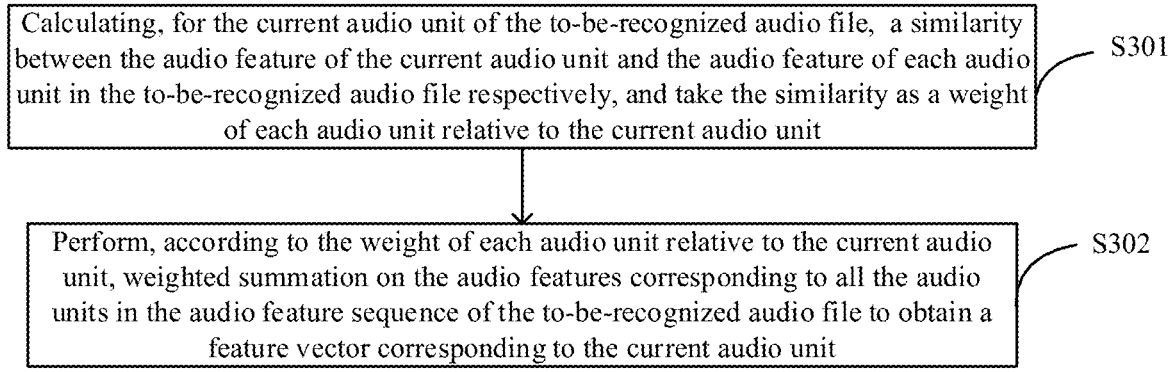
FIG. 3 is a processing flow chart of a second neural network of a speaker recognition method according to yet another embodiment of the present disclosure.

FIG. 3 is a processing flow chart of a second neural network of a speaker recognition method according to yet another embodiment of the present disclosure. As shown in FIG. 3, in an embodiment, the step of performing feature learning on the audio feature sequence of the to-be-recognized audio file by using a second neural network in the Siamese neural network, to obtain the feature vectors respectively corresponding to the plurality of audio units in the to-be-recognized audio file may specifically include:

Step S301: Calculate, for the current audio unit of the to-be-recognized audio file, a similarity between the audio feature of the current audio unit and the audio feature of each audio unit in the to-be-recognized audio file respectively, and take the similarity as a weight of each audio unit relative to the current audio unit; and Step S302: Perform, according to the weight of each audio unit relative to the current audio unit, weighted summation on the audio features corresponding to all the audio units in the audio feature sequence of the to-be-recognized audio file to obtain a feature vector corresponding to the current audio unit.

In an example, the audio feature sequence of the to-be-recognized audio file includes n audio units, denoted as $v_1$, $v_2, \ldots$, and $v_n$. A similarity between the current audio unit and each of all the audio units in the audio feature sequence of the to-be-recognized audio file is calculated respectively. Specifically, similarities between the audio features of the current audio unit and the respective audio features of all audio unit in the to-be-recognized audio file may be calculated.

For example, if the current audio unit is $v_1$, similarities between $v_1$ and $v_1$, $v_1$ and $v_2$, $v_1$ and $v_3$, ..., and $v_1$ and $v_n$ are calculated, denoted as $v_{11}, v_{12}, v_{13}, \ldots$, and $v_{1n}$. The $v_{11}$, $v_{12}, v_{13}, \ldots$, and $v_{1n}$ are normalized to obtain $v_{11}'$, $v_{12}'$, $v_{13}'$, ..., and $v_{1n}'$. $v_{11}'$ is taken as a weight corresponding to $v_1$, $v_{12}'$ is taken as a weight corresponding to $v_2$, $v_{13}'$ is taken as a weight corresponding to $v_3$, ..., and $v_{1n}'$ is taken as a weight corresponding to $v_n$. Then weighted summation is performed on the audio features corresponding to all the audio units in the audio feature sequence of the to-be-recognized audio file to obtain a feature vector corresponding to the current audio unit $v_1$:

$$A1 = v11'v1 + v12'v2 + v13'v3 + \ldots + v1n'vn$$

For another example, if the current audio unit is $v_2$, similarities between $v_2$ and $v_1$, $v_2$ and $v_2$, $v_2$ and $v_3$, ..., and $v_2$ and $v_n$ are calculated, denoted as $v_{21}, v_{22}, v_{23}, \ldots$, and $v_{2n}$. The $v_{21}, v_{22}, v_{23}, \ldots$, and $v_{2n}$ are normalized to obtain $v_{21}'$, $v_{22}'$, $v_{23}'$, ..., and $v_{2n}'$. $v_{21}'$ is taken as a weight corresponding to $v_1$, $v_{22}'$ is taken as a weight corresponding to $v_2$, $v_{23}'$ is taken as a weight corresponding to $v_3$, ..., and $v_{2n}'$ is taken as a weight corresponding to $v_n$. Then weighted summation is performed on the audio features corresponding to all the audio units in the audio feature sequence of the to-be-recognized audio file to obtain a feature vector corresponding to the current audio unit $v_2$:

$$A2 = v21'v1 + v22'v2 + v23'v3 + \ldots + v2n'vn$$

In the example shown in FIG. 2, the to-be-recognized audio file is a classroom recording. The sequential features of the classroom recording (Classroom Sequential Reps.) in FIG. 2 indicate that the output results of the second neural network are the feature vectors corresponding to the audio units in the classroom recording.

Figure 4:
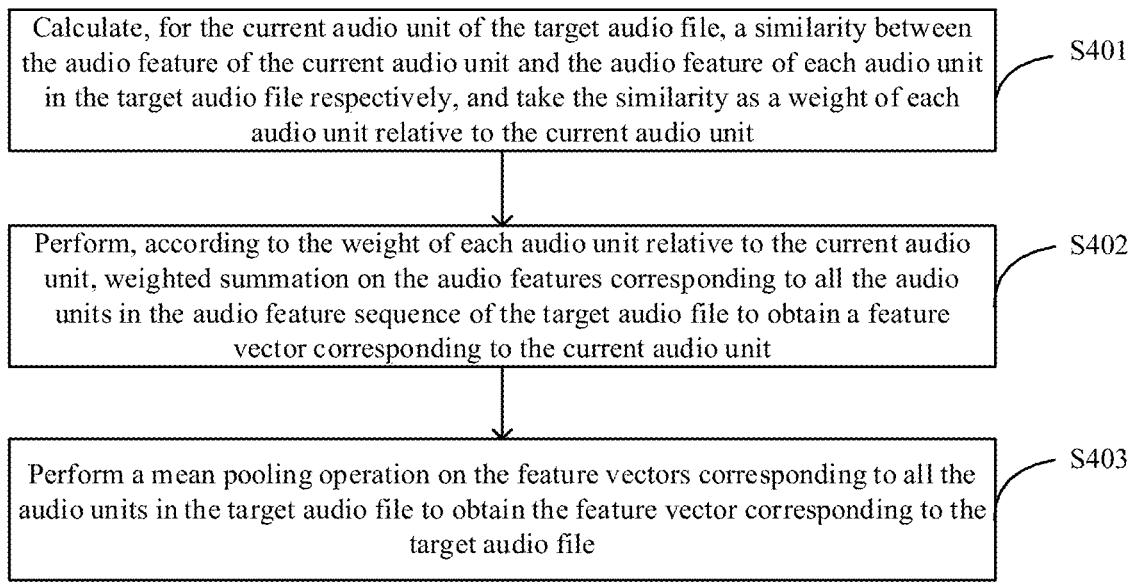
FIG. 4 is a processing flow chart of a first neural network of a speaker recognition method according to another embodiment of the present disclosure.

FIG. 4 is a processing flow chart of a first neural network of a speaker recognition method according to another embodiment of the present disclosure. As shown in FIG. 4, in an embodiment, the step of performing feature learning on the audio feature sequence of the target audio file by using a first neural network in the Siamese neural network, to obtain the feature vector corresponding to the target audio file may specifically include:

Step S401: Calculate, for the current audio unit of the target audio file, a similarity between the audio feature of the current audio unit and the audio feature of each audio unit in the target audio file respectively, and take the similarity as a weight of each audio unit relative to the current audio unit;

Step S402: Perform, according to the weight of each audio unit relative to the current audio unit, weighted summation on the audio features corresponding to all the audio units in the audio feature sequence of the target audio file to obtain a feature vector corresponding to the current audio unit; and Step S402: Perform a mean pooling operation on the feature vectors corresponding to all the audio units in the target audio file to obtain the feature vector corresponding to the target audio file.

In an example, the audio feature sequence of the target audio file includes m audio units, denoted as $u_1, u_2, \ldots,$ and $u_m$. A similarity between the current audio unit and each of all the audio units in the audio feature sequence of the target audio file is calculated respectively. Specifically, similarities between the audio feature of the current audio unit and the respective audio features of all audio units in the target audio file may be calculated.

For example, if the current audio unit is $u_1$, similarities between $u_1$ and $u_1$, $u_1$ and $u_2$, $u_1$ and $u_3$, ..., and $u_1$ and $u_m$ are calculated, denoted as $u_{11}, u_{12}, u_{13}, \ldots,$ and $u_{1m}$. The $u_{11}, u_{12}, u_{13}, \ldots,$ and $u_{1m}$ are normalized to obtain $u_{11}', u_{12}', u_{13}', \ldots,$ and $u_{1m}'$. $u_{11}'$ is taken as a weight corresponding to $u_1$, $u_{12}'$ is taken as a weight corresponding to $u_2$, $u_{13}'$ is taken as a weight corresponding to $u_3, \ldots,$ and $u_{1m}'$ is taken as a weight corresponding to $u_m$. Then weighted summation is performed on the audio features corresponding to all the audio units in the audio feature sequence of the target audio file to obtain a feature vector corresponding to the current audio unit $u_1$:

$$B1 = u11'u1 + u12'u2 + u13'u3 + \ldots + u1m'um$$

For example, if the current audio unit is $u_2$, similarities between $u_2$ and $u_1$, $u_2$ and $u_2$, $u_2$ and $u_3$, ..., and $u_2$ and $u_m$ are calculated, denoted as $u_{21}, u_{22}, u_{23}, \ldots,$ and $u_{2m}$. The $u_{21}, u_{22}, u_{23}, \ldots,$ and $u_{2m}$ are normalized to obtain $u_{21}', u_{22}', u_{23}', \ldots,$ and $u_{2m}'$. $u_{21}'$ is taken as a weight corresponding to $u_1$, $u_{22}$ is taken as a weight corresponding to $u_2$, $u_{23}'$ is taken as a weight corresponding to $u_3, \ldots,$ and $u_{2m}'$ is taken as a weight corresponding to $u_m$. Then weighted summation is performed on the audio features corresponding to all the audio units in the audio feature sequence of the target audio file to obtain a feature vector corresponding to the current audio unit $u_2$:

$$B2 = u21'u1 + u22'u2 + u23'u3 + \ldots + u2m'um$$

Finally, a mean pooling operation is performed on the feature vectors B1, B2, ..., and Bn corresponding to all the audio units in the target audio file to obtain the feature vector corresponding to the target audio file.

The pooling process is a dimensionality reduction process. For example, each 2×2 sub-matrix in a matrix is simplified to a value by mean pooling, that is, taking a mean value of all elements in the sub-matrix. The foregoing process is called 2×2 pooling. Feature space dimensions can be reduced on the neural network through a pooling layer.

In the example shown in FIG. 2, the target audio file is a teacher vocal sample. A mean pooling (Mean Pooling) operation is performed on the feature vectors corresponding to all the audio units in the target audio file. The output result of the first neural network in FIG. 2 is an aggregated feature of the teacher vocal sample (Teacher's Aggregated Reps.). The aggregated feature of the teacher vocal sample is a robustness-enhanced feature vector obtained after the mean pooling operation is performed on the feature vectors corresponding to all the audio units in the teacher vocal sample.

In the embodiment of the present disclosure, a mean pooling operation is performed on the feature vectors corresponding to all the audio units in the target audio file to obtain a feature vector with strong robustness corresponding to the target audio file, which can better characterize the audio features of the target speaker.

In an embodiment, the first neural network and the second neural network may be transformers (self-attention module-based sequence encoding networks). The feature vector corresponding to the target audio file and the feature vectors respectively corresponding to the plurality of audio units in the to-be-recognized audio file are calculated by using attention mechanisms in the transformers. The attention mechanism may include mapping from a query vector to a series of key vector-value vector pairs. The output result of the attention mechanism is calculated by weighted summation on values, and the weight corresponding to each value is calculated by query and key.

In this embodiment, after the audio feature sequences of the target audio file and the to-be-recognized audio file are respectively input into the transformers of the Siamese neural network, in the process flow of each transformer, feature extraction is first performed on the audio feature sequences by using three feature extraction layers, and then a query vector, a key vector and a value vector are respectively generated by three fully connected layers. In an example, any two of the query vector, the key vector and the value vector are not equal to each other. Parameters of the three fully connected layers used to generate the above three vectors are different from each other.

In the previous process flow, the target audio file and the to-be-recognized audio file are respectively segmented into a plurality of audio units by using preset sliding windows. Each window corresponds to an audio unit. In the target audio file and the to-be-recognized audio file, the key represents a key vector corresponding to each window, and the query represents a query vector corresponding to the current query window. A similarity between the query and the key corresponding to each of all the audio units is calculated to obtain a weight corresponding to each of the audio units relative to the current query window. Commonly used similarity functions include a dot product and the like. The weights can then be normalized by using a softmax function. Finally, weighted summation is performed on the weights corresponding to all the audio units and the corresponding values to obtain a feature vector corresponding to the current query window. Sigmoid is a nonlinear transformation function: $f(x) = 1/(1+e^{-x})$.

In the to-be-recognized audio file and the target audio file, the current query window corresponds to the current audio unit. After the audio feature sequences of the target audio file and the to-be-recognized audio file are respectively input into the transformers of the Siamese neural network, a feature vector corresponding to the current audio unit of the to-be-recognized audio file and a feature vector corresponding to the current audio unit of the target audio file can be obtained. All the audio units in the to-be-recognized audio file and the target audio file are traversed respectively according to the foregoing method, and feature vectors corresponding to all the audio units can be obtained. Then, a mean pooling operation is performed on the feature vectors corresponding to all the audio units in the target audio file to obtain the feature vector corresponding to the target audio file.

In the embodiment of the present disclosure, the similarities between the audio units are taken as weights in the above various forms of weighted summation calculation, so that the finally obtained feature vector corresponding to an audio unit fuses the audio features of other audio units in the audio file. Through the above various forms of weighted summation calculation, after the audio feature sequence of the target audio file and the audio feature sequence of the to-be-recognized audio file are processed by the Siamese neural network, the feature of each of the audio units in the audio feature sequences is enhanced by the features in the front and back audio units, and its feature representation ability is enhanced. Comparing the method of the embodiment of the present disclosure with the prior art, it can be seen that the independent comparison on the code of each segment of an audio file in the prior art loses sequential information of the front and back segments of the audio file. In the embodiment of the present disclosure, continuous information of front and back voice signals in a long audio file are fully used to help a model obtain more accurate recognition results.

Figure 5:
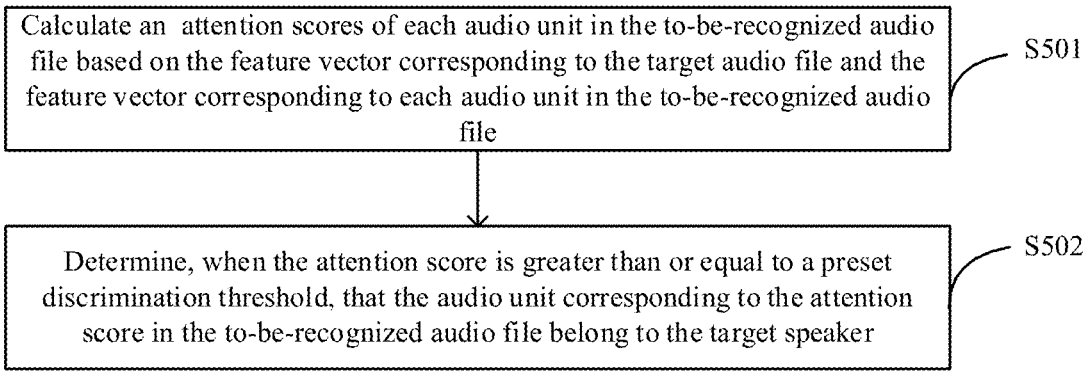
FIG. 5 is a processing flow chart of an attention mechanism-based machine learning model of a speaker recognition method according to another embodiment of the present disclosure.

FIG. 5 is a processing flow chart of an attention mechanism-based machine learning model of a speaker recognition method according to another embodiment of the present disclosure. As shown in FIG. 5, in an embodiment, recognizing, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file, in step S105 of FIG. 1 may specifically include:

Step S501: Calculate an attention score of each audio unit in the to-be-recognized audio file based on the feature vector corresponding to the target audio file and the feature vector corresponding to each audio unit in the to-be-recognized audio file; and Step S502: determine, when the attention score is greater than or equal to a preset discrimination threshold, that the audio unit corresponding to the attention score in the to-be-recognized audio file belong to the target speaker.

Figure 6:
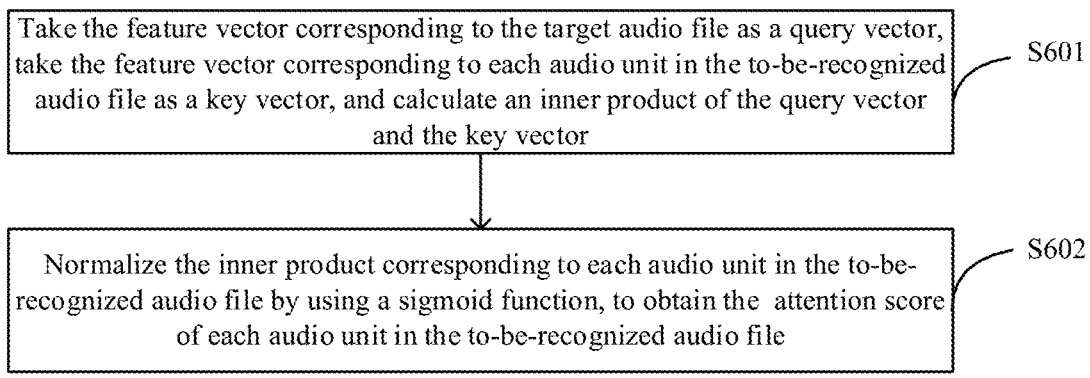
FIG. 6 is a processing flow chart of an attention mechanism-based machine learning model of a speaker recognition method according to another embodiment of the present disclosure.

FIG. 6 is a processing flow chart of an attention mechanism-based machine learning model of a speaker recognition method according to another embodiment of the present disclosure. As shown in FIG. 6, in an embodiment, the calculating an attention score of each audio unit in the to-be-recognized audio file based on the feature vector corresponding to the target audio file and the feature vector corresponding to each audio unit in the to-be-recognized audio file in step S501 of FIG. 5 includes:

Step S601: Take the feature vector corresponding to the target audio file as a query vector, take the feature vector corresponding to each audio unit in the to-be-recognized audio file as a key vector, and calculate an inner product of the query vector and the key vector; and Step S602: Normalize the inner product corresponding to each audio unit in the to-be-recognized audio file by using a sigmoid function, to obtain the attention score of each audio unit in the to-be-recognized audio file.

In the embodiment of the present disclosure, in the attention mechanism-based machine learning model, the attention score is calculated according to the query vector and the key vector. Still taking the application scenario of classroom quality evaluation as an example, the feature vector corresponding to the teacher vocal sample is taken as a query vector, the feature vector corresponding to each audio unit in the classroom recording are taken as a key vector, and an inner product of the query vector and the key vector is calculated. Then, the calculated inner product each audio unit in the classroom recording is normalized by using a sigmoid function, to obtain the attention score of each audio unit in the classroom recording. Sigmoid is a nonlinear transformation function: $f(x)=1/(1+e^{-x})$.

After the attention scores are obtained by calculation, it is determined according to a preset discrimination threshold whether the audio units in the to-be-recognized audio file belong to the target speaker. For example, the preset discrimination threshold is 0.5. When the attention score of a certain audio unit in the classroom recording is greater than or equal to 0.5, the machine learning model determines that the sound role of the audio unit belongs to the teacher. When the attention score of a certain audio unit in the classroom recording is less than 0.5, the machine learning model determines that the sound role of the audio unit belongs to the students.

With reference to the example of FIG. 2, in an attention mechanism-based machine learning prediction module (Attentional Prediction), the aggregated feature of the teacher vocal sample (Teacher's Aggregated Reps.) and the sequential features of the classroom recording (Classroom Sequential Reps.) are input into an attention mechanism-based prediction module (Attentional Prediction), to obtain window-level detection results (Window-Level Detection Results).

In an embodiment, the method further includes: connecting the audio units belonging to the target speaker that are continuous in time in the to-be-recognized audio file to obtain at least one speaking time period belonging to the target speaker.

The audio units belonging to the teacher are recognized by the above process, and then the audio units belonging to the same role and continuous in time are connected to obtain intervals of speaking time between the teacher and students in the whole classroom recording.

In an example, after the classroom recording is segmented into audio units by using sliding windows, a voice serial number of each of the audio units can be recorded, that is, the sliding window corresponding to each of the audio units is marked, and corresponding start time of each of the audio units in the classroom recording is recorded. Then, the audio units belonging to the teacher are recognized by using the speaker recognition method according to the embodiment of the present disclosure. By using the pre-marked voice serial numbers and the recorded corresponding start time, the audio units belonging to the teacher and continuous in time are connected to obtain teacher speaking time periods in the classroom recording.

Figure 7:
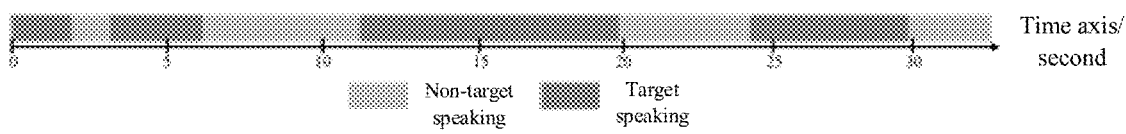
FIG. 7 is a schematic diagram of prediction results of a speaker recognition method according to another embodiment of the present disclosure.

FIG. 7 is a schematic diagram of prediction results of a speaker recognition method according to another embodiment of the present disclosure. As shown in FIG. 7, each speaking time period is marked with a different color on the time axis of the classroom recording by using the pre-marked voice serial number and the corresponding start time recorded, and the final result is presented as shown in FIG. 7. In FIG. 7, "target speaking" represents a speaking time period corresponding to the teacher; "non-target speaking" represents a speaking time period corresponding to students.

In the embodiment of the present disclosure, feature learning is performed on audio feature sequences of audio files by using Siamese neural network, which can make full use of continuous information of front and back voice signals in a long audio file to help a model obtain more accurate recognition results, and on this basis, a speaker role determination structure based on an attention score is used to further improve the accuracy of speaker recognition.

Figure 8:
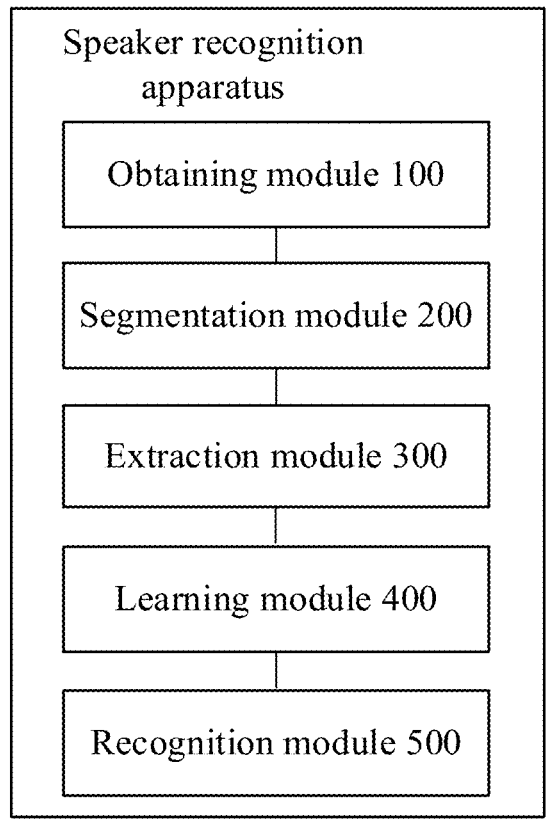
FIG. 8 is a schematic diagram of a structure of a speaker recognition apparatus according to an embodiment of the present disclosure.

FIG. 8 is a schematic diagram of a structure of a speaker recognition apparatus according to an embodiment of the present disclosure. As shown in FIG. 8, the apparatus may include:

an obtaining module 100, configured to obtain a target audio file and a to-be-recognized audio file, the target audio file including an audio of a target speaker;

a segmentation module 200, configured to segment the target audio file and the to-be-recognized audio file into a plurality of audio units respectively;

an extraction module 300, configured to extract a corresponding audio feature from each of the audio units to obtain an audio feature sequence of the target audio file and an audio feature sequence of the to-be-recognized audio file;

a learning module 400, configured to perform feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file; and a recognition module 500, configured to, recognize, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file.

Figure 9:
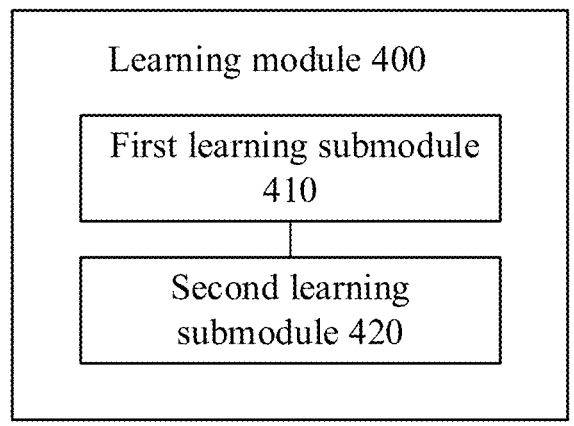
FIG. 9 is a schematic diagram of a structure of a learning module of the speaker recognition apparatus according to an embodiment of the present disclosure.

FIG. 9 is a schematic diagram of a structure of the learning module of the speaker recognition apparatus according to an embodiment of the present disclosure. As shown in FIG. 9, in some embodiments, the learning module 400 includes:

a first learning submodule 410, configured to perform feature learning on the audio feature sequence of the target audio file by using a first neural network in the Siamese neural network, to obtain the feature vector corresponding to the target audio file; and a second learning submodule 420, configured to perform feature learning on the audio feature sequence of the to-be-recognized audio file by using a second neural network in the Siamese neural network, to obtain the feature vectors respectively corresponding to the plurality of audio units in the to-be-recognized audio file.

In an embodiment, the first neural network or the second neural network includes at least one of the following: a deep neural network, a gated recurrent unit GRU-based bi-directional recurrent neural network, a long short-term memory LSTM-based bi-directional recurrent neural network, or a self-attention module-based sequence encoding network.

In some embodiments, the second learning submodule 420 is specifically configured to:

calculate, for a current audio unit of the to-be-recognized audio file, a similarity between the audio feature of the current audio unit and the audio feature of each audio unit in the to-be-recognized audio file respectively, and take the similarity as a weight of each audio unit relative to the current audio unit; and perform, according to the weight of each audio unit relative to the current audio unit, weighted summation on the audio features corresponding to all the audio units in the audio feature sequence of the to-be-recognized audio file to obtain a feature vector corresponding to the current audio unit.

In some embodiments, the first learning submodule 410 is specifically configured to:

Calculate, for the current audio unit of the target audio file, a similarity between the audio feature of the current audio unit and the audio feature of each audio unit in the target audio file respectively, and take the similarity as a weight of each audio unit relative to the current audio unit;

perform, according to the weights, weighted summation on the audio features corresponding to all the audio units in the audio feature sequence of the target audio file to obtain a feature vector corresponding to the current audio unit; and perform a mean pooling operation on the feature vectors corresponding to all the audio units in the target audio file to obtain the feature vector corresponding to the target audio file.

Figure 10:
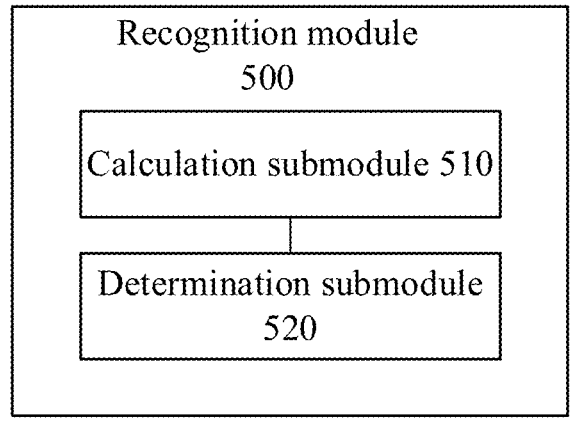
FIG. 10 is a schematic diagram of a structure of a recognition module of the speaker recognition apparatus according to an embodiment of the present disclosure.

FIG. 10 is a schematic diagram of a structure of the recognition module of the speaker recognition apparatus according to an embodiment of the present disclosure. As shown in FIG. 10, in some embodiments, the recognition module 500 includes:

a calculation submodule 510, configured to calculate an attention score of each audio unit in the to-be-recognized audio file based on the feature vector corresponding to the target audio file and the feature vector corresponding to each audio unit in the to-be-recognized audio file; and a determination submodule 520, configured to determine, when the attention score is greater than or equal to a preset discrimination threshold, that the audio unit corresponding to the attention score in the to-be-recognized audio file belong to the target speaker.

In some embodiments, the calculation submodule 510 is specifically configured to:

take the feature vector corresponding to the target audio file as a query vector, take the feature vector corresponding to each audio unit in the to-be-recognized audio file as a key vector, and calculate an inner product of the query vector and the key vector; and normalize the inner product corresponding to each audio unit in the to-be-recognized audio file by using a sigmoid function, to obtain the attention score of each audio unit in the to-be-recognized audio file.

Figure 11:
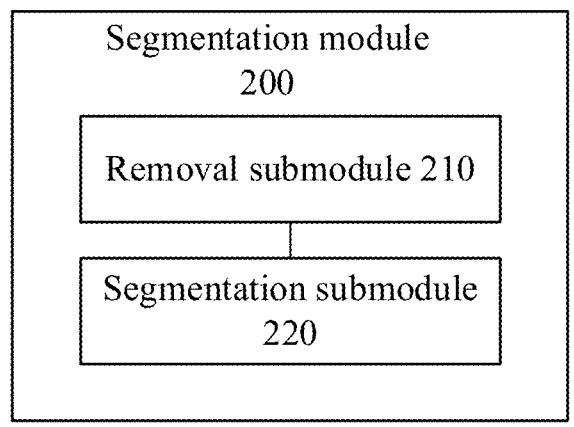
FIG. 11 is a schematic diagram of a structure of a segmentation module of the speaker recognition apparatus according to an embodiment of the present disclosure.

FIG. 11 is a schematic diagram of a structure of the segmentation module of the speaker recognition apparatus according to an embodiment of the present disclosure. As shown in FIG. 11, in some embodiments, the segmentation module 200 includes:

a removal submodule 210, configured to remove silence segments from the target audio file and the to-be-recognized audio file by using a voice activity detection model; and a segmentation submodule 220, configured to segment the target audio file and the to-be-recognized audio file from which the silence segments are removed into the plurality of audio units respectively.

Figure 12:
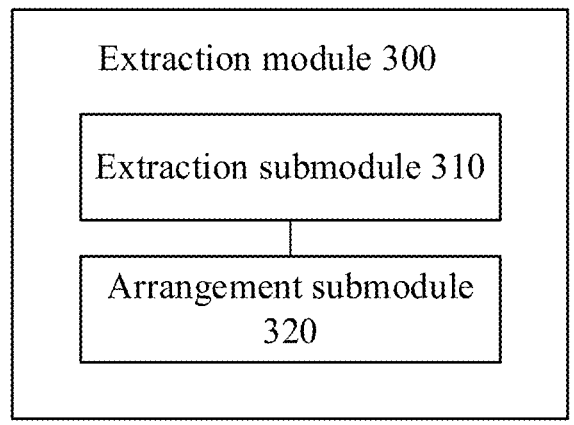
FIG. 12 is a schematic diagram of a structure of an extraction module of the speaker recognition apparatus according to an embodiment of the present disclosure.

FIG. 12 is a schematic diagram of a structure of the extraction module of the speaker recognition apparatus according to an embodiment of the present disclosure. As shown in FIG. 12, in some embodiments, the extraction module 300 includes:

an extraction submodule 310, configured to extract a corresponding audio feature of each of the audio units by using a voiceprint encoding model; and an arrangement submodule 320, configured to arrange, respectively for the target audio file and the to-be-recognized audio file, the audio features in chronological order to obtain the audio feature sequence of the target audio file and the audio feature sequence of the to-be-recognized audio file.

Figure 13:
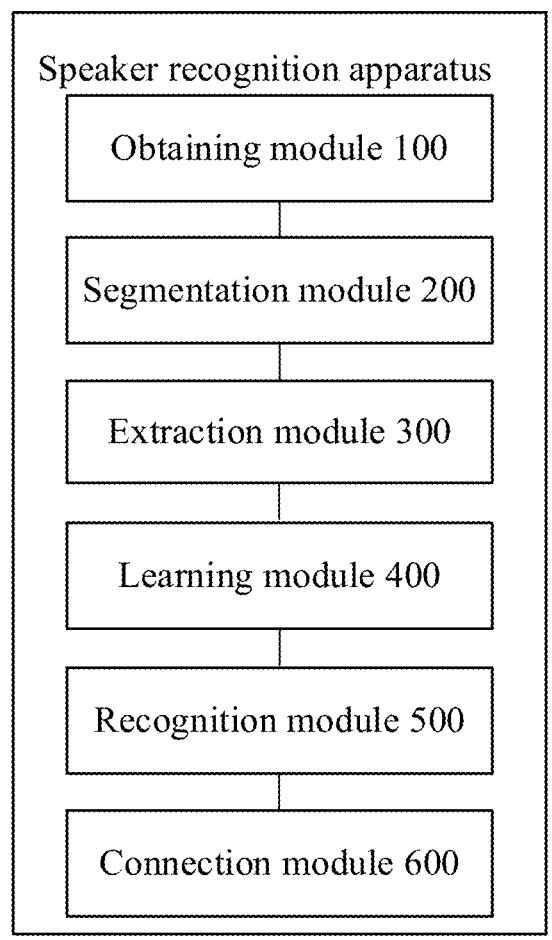
FIG. 13 is a schematic diagram of a structure of a speaker recognition apparatus according to another embodiment of the present disclosure.

FIG. 13 is a schematic diagram of a structure of a speaker recognition apparatus according to another embodiment of the present disclosure. As shown in FIG. 13, in some embodiments, the speaker recognition apparatus further includes:

a connection module 600, configured to connect the audio units belonging to the target speaker that are continuous in time in the to-be-recognized audio file to obtain at least one speaking time period belonging to the target speaker.

The functions of various modules in each apparatus of the embodiment of the present disclosure can refer to the corresponding descriptions in the foregoing method, and details are not described herein again.

In other implementation manners, this embodiment further provides an electronic device, which includes a processor and a memory in which instructions are stored, the instructions being loaded and executed by the processor to implement the methods of the foregoing embodiments.

In other implementation manners, this embodiment further provides a computer-readable storage medium, storing a computer program that, when executed by a processor, implements the methods of the foregoing embodiments.

Figure 14:
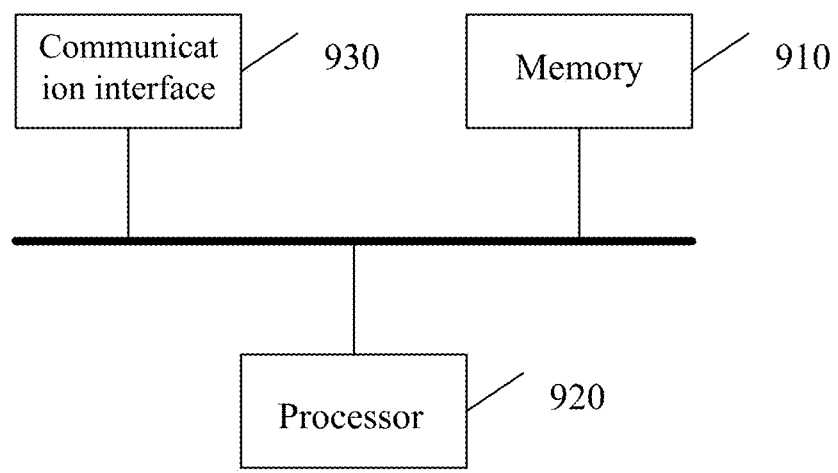
FIG. 14 is a block diagram of an electronic device used to implement the embodiments of the present disclosure.

FIG. 14 is a block diagram of an electronic device used to implement the embodiments of the present disclosure. As shown in FIG. 14, the electronic device includes a memory 910 and a processor 920. A computer program executable on the processor 920 is stored in the memory 910. The processor 920 implements the speaker recognition method in the foregoing embodiments when executing the computer program. The numbers of the memory 910 and the processor 920 may be one or more.

The electronic device further includes:

a communication interface 930, configured to communicate with external devices for interactive data transmission.

If the memory 910, the processor 920, and the communication interface 930 are implemented independently, the memory 910, the processor 920, and the communication interface 930 may be connected to each other by a bus and complete communication with each other. The bus may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, etc. For ease expression, the bus is represented by a single thick line in FIG. 14, which does not mean that there is only one bus or one type of bus.

Alternatively, in a specific implementation, if the memory 910, the processor 920, and the communication interface 930 are integrated on a single chip, the memory 910, the processor 920, and the communication interface 930 may communicate with each other through an internal interface.

An embodiment of the present disclosure provides a computer-readable storage medium storing a computer program that, when executed by a processor, implements the method provided in the embodiments of the present disclosure.

An embodiment of the present disclosure further provides a chip including a processor for calling and running instructions stored in a memory from the memory to enable a communication device installed with the chip to execute the method provided in the embodiments of the present disclosure.

An embodiment of the present disclosure further provides a chip, including: an input interface, an output interface, a processor and a memory. The input interface, the output interface, the processor and the memory are connected by an internal connection path. The processor is configured to execute codes in the memory. When the codes are executed, the processor is configured to execute the method provided in the embodiments of the present disclosure.

It should be understood that the foregoing processor may be a central processing unit (Central Processing Unit, CPU), and may also be other general-purpose processor, a digital signal processor (digital signal processing, DSP), an application specific integrated circuit (application specific integrated circuit, ASIC), a field-programmable gate array (field programmable gate array, FPGA), other programmable logic device, a discrete gate or transistor logic device, a discrete hardware component, etc. The general-purpose processor may be a microprocessor, any conventional processor, or the like. It is worth noting that the processor may be a processor that supports advanced RISC machines (advanced RISC machines, ARM) architecture.

Further, optionally, the foregoing memory may include a read-only memory and a random access memory, and may also include a non-volatile random access memory. The memory may be a volatile memory or a non-volatile memory, or may include both volatile and non-volatile memories. The non-volatile memory may include a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may include a random access memory (random access memory, RAM) serving as an external cache. By way of illustration but not limitation, many forms of RAM are available, such as a static RAM (static RAM, SRAM), a dynamic random access memory (dynamic random access memory, DRAM), a synchronous DRAM (synchronous DRAM, SDRAM), a double data rate SDRAM (double data rate SDRAM, DDR SDRAM), an enhanced SDRAM (enhanced SDRAM, ESDRAM), a synchlink DRAM (synchlink DRAM, SLDRAM), and a direct rambus RAM (direct rambus RAM, DR RAM).

In the foregoing embodiments, the components may be all or partially implemented by software, hardware, or any combination thereof. When implemented by software, the components may be all or partially implemented in the form of a computer program product. The computer program product includes one or more computer instructions. When computer program instructions are loaded and executed on a computer, the flows or functions according to the present disclosure are generated in whole or in part. The computer may be a general-purpose computer, a special-purpose computer, a computer network, or other programmable apparatus. The computer instructions may be stored in a computer-readable storage medium or transmitted from one computer-readable storage medium to another.

In the description of this specification, the terms "one embodiment", "some embodiments", "an example", "a specific example", "some examples", or the like mean that specific features, structures, materials, or characteristics described in conjunction with the embodiments or examples are included in at least one embodiment or example of the present disclosure. Moreover, the specific features, structures, materials, or characteristics described may be combined appropriately in one or more embodiments or examples. In addition, different embodiments or examples described in this specification and features of different embodiments or examples may be combined by those skilled in the art without conflicting with each other.

Furthermore, the terms "first" and "second" are only for the sake of description, and cannot be understood as indicating or implying the relative importance or implicitly indicating the quantity of the indicated technical features. Thus, features defined as "first" and "second" may expressly or implicitly include at least one of the features. In the description of the present disclosure, "a plurality of" means two or more, unless otherwise specified.

Any process or method description in a flowchart or otherwise described herein may be understood as representing a module, fragment, or portion of codes including one or more executable instructions for implementing a particular logical function or step of a process. In addition, the scope of the preferred embodiments of the present disclosure includes additional implementations in which functions may be performed not in the order shown or discussed, including in a substantially simultaneous manner or in reverse order depending on the functions involved.

Logics and/or steps represented in the flow charts or otherwise described herein, for example, they may be considered as a sequencing table of executable instructions for implementing logical functions, and may be embodied in any computer-readable medium for use with, or in conjunction with, instruction execution systems, apparatuses, or devices such as computer-based systems, systems including processors, or other systems that can fetch and execute instructions from the instruction execution systems, apparatuses, or devices.

It should be understood that various parts of the present disclosure may be implemented by hardware, software, firmware, or a combination thereof. In the foregoing embodiments, a plurality of steps or methods may be implemented with software or firmware stored in a memory and executed by a suitable instruction execution system. All or part of the steps of the method of the foregoing embodiments may be performed by instructing relevant hardware through a program stored in a computer-readable storage medium that, when executed, includes one or a combination of the steps of the method embodiments.

In addition, each functional unit in each embodiment of the present disclosure may be integrated in one processing unit, or each unit may exist alone physically, or two or more units may be integrated in one unit. The integrated module may be implemented in the form of hardware or a software functional module. The integrated module may also be stored in a computer-readable storage medium if implemented in the form of a software functional module and sold or used as a stand-alone product. The storage medium may be a read-only memory, a magnetic disk, an optical disk, or the like.

Described above are merely specific embodiments of the present disclosure, but the protection scope of the present disclosure is not limited to this. Any skilled person who is familiar with this technical field could readily conceive of variations or substitutions within the disclosed technical scope of the present disclosure, and these variations or substitutions shall fall within the protection scope of the present disclosure. Therefore, the protection scope of the present disclosure shall be subject to the protection scope of the claims.

What is claimed is:

1. A speaker recognition method, comprising:
    obtaining a target audio file and a to-be-recognized audio file, the target audio file comprising an audio of a target speaker;
    segmenting the target audio file and the to-be-recognized audio file into a plurality of audio units respectively;
    extracting a corresponding audio feature from each of the audio units to obtain an audio feature sequence of the target audio file and an audio feature sequence of the to-be-recognized audio file;
    performing feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file; and
    recognizing, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file.

2. The method according to claim 1, the step of performing feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file comprises:
    performing feature learning on the audio feature sequence of the target audio file by using a first neural network in the Siamese neural network, to obtain the feature vector corresponding to the target audio file; and performing feature learning on the audio feature sequence of the to-be-recognized audio file by using a second neural network in the Siamese neural network, to obtain the feature vectors respectively corresponding to the plurality of audio units in the to-be-recognized audio file.

3. The method according to claim 2, the first neural network or the second neural network comprises at least one of: a deep neural network, a gated recurrent unit GRU-based bi-directional recurrent neural network, a long short-term memory LSTM-based bi-directional recurrent neural network, or a self-attention module-based sequence encoding network.

4. The method according to claim 2, the step of performing feature learning on the audio feature sequence of the to-be-recognized audio file by using a second neural network in the Siamese neural network, to obtain the feature vectors respectively corresponding to the plurality of audio units in the to-be-recognized audio file comprises:
    calculating, for a current audio unit of the to-be-recognized audio file, a similarity between the audio feature of the current audio unit and the audio feature of each audio unit in the to-be-recognized audio file respectively, and taking the similarity as a weight of each audio unit relative to the current audio unit; and
    performing, according to the weight of each audio unit relative to the current audio unit, weighted summation on the audio features corresponding to all the audio units in the audio feature sequence of the to-be-recognized audio file to obtain a feature vector corresponding to the current audio unit.

5. The method according to claim 2, the step of performing feature learning on the audio feature sequence of the target audio file by using a first neural network in the Siamese neural network, to obtain the feature vector corresponding to the target audio file comprises:

calculating, for a current audio unit of the target audio file, a similarity between the audio feature of the current audio unit and the audio feature of each audio unit in the target audio file respectively, and taking the similarity as a weight of each audio unit relative to the current audio unit;

performing, according to the weight of each audio unit relative to the current audio unit, weighted summation on the audio features corresponding to all the audio units in the audio feature sequence of the target audio file to obtain a feature vector corresponding to the current audio unit; and performing a mean pooling operation on the feature vectors corresponding to all the audio units in the target audio file to obtain the feature vector corresponding to the target audio file.

6. The method according to claim 1, the step of recognizing, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file, comprises:

calculating an attention score of each audio unit in the to-be-recognized audio file based on the feature vector corresponding to the target audio file and the feature vector corresponding to each audio unit in the to-be-recognized audio file; and determining, when the attention score is greater than or equal to a preset discrimination threshold, that the audio unit corresponding to the attention score in the to-be-recognized audio file belong to the target speaker.

7. The method according to claim 6, the step of calculating an attention score of each audio unit in the to-be-recognized audio file based on the feature vector corresponding to the target audio file and the feature vector corresponding to each audio unit in the to-be-recognized audio file comprises:

taking the feature vector corresponding to the target audio file as a query vector, taking the feature vector corresponding to each audio unit in the to-be-recognized audio file as a key vector, and calculating an inner product of the query vector and the key vector; and normalizing the inner product corresponding to each audio unit in the to-be-recognized audio file by using a sigmoid function, to obtain the attention score of each audio unit in the to-be-recognized audio file.

8. The method according to claim 1, the step of segmenting the target audio file and the to-be-recognized audio file into a plurality of audio units respectively comprises:

removing silence segments from the target audio file and the to-be-recognized audio file by using a voice activity detection model; and segmenting the target audio file and the to-be-recognized audio file from which the silence segments are removed into the plurality of audio units respectively.

9. The method according to claim 1, the step of extracting a corresponding audio feature from each of the audio units to obtain an audio feature sequence of the target audio file and an audio feature sequence of the to-be-recognized audio file comprises:

extracting a corresponding audio feature of each of the audio units by using a voiceprint encoding model; and arranging, respectively for the target audio file and the to-be-recognized audio file, the audio features in chronological order to obtain the audio feature sequence of the target audio file and the audio feature sequence of the to-be-recognized audio file.

10. The method according to claim 1, the method further comprising:

connecting the audio units belonging to the target speaker that are continuous in time in the to-be-recognized audio file to obtain at least one speaking time period belonging to the target speaker.

11. An electronic device, comprising a processor and a memory in which instructions are stored, the instructions being loaded and executed by the processor to implement operations including:

obtaining a target audio file and a to-be-recognized audio file, the target audio file comprising an audio of a target speaker;

segmenting the target audio file and the to-be-recognized audio file into a plurality of audio units respectively;

extracting a corresponding audio feature from each of the audio units to obtain an audio feature sequence of the target audio file and an audio feature sequence of the to-be-recognized audio file;

performing feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file; and recognizing, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file.

12. The electronic device according to claim 11, the operation of performing feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file comprises:

performing feature learning on the audio feature sequence of the target audio file by using a first neural network in the Siamese neural network, to obtain the feature vector corresponding to the target audio file; and performing feature learning on the audio feature sequence of the to-be-recognized audio file by using a second neural network in the Siamese neural network, to obtain the feature vectors respectively corresponding to the plurality of audio units in the to-be-recognized audio file.

13. The electronic device according to claim 12, the first neural network or the second neural network comprises at least one of the following: a deep neural network, a gated recurrent unit GRU-based bi-directional recurrent neural network, a long short-term memory LSTM-based bi-directional recurrent neural network, or a self-attention module-based sequence encoding network.

14. The electronic device according to claim 12, wherein the operation of performing feature learning on the audio feature sequence of the to-be-recognized audio file by using a second neural network in the Siamese neural network, to obtain the feature vectors respectively corresponding to the plurality of audio units in the to-be-recognized audio file comprises:

calculating, for a current audio unit of the to-be-recognized audio file, a similarity between the audio feature of the current audio unit and the audio features of each audio unit in the to-be-recognized audio file respectively, and taking the similarity as a weight of each audio unit relative to the current audio unit; and performing, according to the weight of each audio unit relative to the current audio unit, weighted summation on the audio features corresponding to all the audio units in the audio feature sequence of the to-be-recognized audio file to obtain a feature vector corresponding to the current audio unit; or the operation of performing feature learning on the audio feature sequence of the target audio file by using a first neural network in the Siamese neural network, to obtain the feature vector corresponding to the target audio file comprises:

calculating, for a current audio unit of the target audio file, a similarity between the audio feature of the current audio unit and the audio feature of each audio unit in the target audio file respectively, and taking the similarity as a weight of each audio unit relative to the current audio unit;

performing, according to the weight of each audio unit relative to the current audio unit, weighted summation on the audio features corresponding to all the audio units in the audio feature sequence of the target audio file to obtain a feature vector corresponding to the current audio unit; and performing a mean pooling operation on the feature vectors corresponding to all the audio units in the target audio file to obtain the feature vector corresponding to the target audio file.

15. The electronic device according to claim 11, the operation of recognizing, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file, comprises:

calculating an attention score of each audio unit in the to-be-recognized audio file based on the feature vector corresponding to the target audio file and the feature vector corresponding to each audio unit in the to-be-recognized audio file; and determining, when the attention score is greater than or equal to a preset discrimination threshold, that the audio unit corresponding to the attention score in the to-be-recognized audio file belong to the target speaker.

16. The electronic device according to claim 15, the operation of calculating an attention score of each audio unit in the to-be-recognized audio file based on the feature vector corresponding to the target audio file and the feature vector corresponding to each audio unit in the to-be-recognized audio file comprises:

taking the feature vector corresponding to the target audio file as a query vector, taking the feature vectors corresponding to each audio unit in the to-be-recognized audio file as a key vector, and calculating an inner product of the query vector and the key vector; and normalizing the inner product corresponding to each audio unit in the to-be-recognized audio file by using a sigmoid function, to obtain the attention score of each audio unit in the to-be-recognized audio file.

17. The electronic device according to claim 11, the operation of segmenting the target audio file and the to-be-recognized audio file into a plurality of audio units respectively comprises:

removing silence segments from the target audio file and the to-be-recognized audio file by using a voice activity detection model; and segmenting the target audio file and the to-be-recognized audio file from which the silence segments are removed into the plurality of audio units respectively.

18. The electronic device according to claim 11, the operation of extracting a corresponding audio feature from each of the audio units to obtain an audio feature sequence of the target audio file and an audio feature sequence of the to-be-recognized audio file comprises:

extracting a corresponding audio feature of the each of the audio units by using a voiceprint encoding model; and arranging, respectively for the target audio file and the to-be-recognized audio file, the audio features in chronological order to obtain the audio feature sequence of the target audio file and the audio feature sequence of the to-be-recognized audio file.

19. The electronic device according to claim 11, wherein the instructions are loaded and executed by the processor to further implement an operation including:

connecting the audio units belonging to the target speaker that are continuous in time in the to-be-recognized audio file to obtain at least one speaking time period belonging to the target speaker.

20. A non-transitory computer-readable storage medium storing a computer program, the computer program when executed by a processor implements operations including:

obtaining a target audio file and a to-be-recognized audio file, the target audio file comprising an audio of a target speaker;

segmenting the target audio file and the to-be-recognized audio file into a plurality of audio units respectively;

extracting a corresponding audio feature from each of the audio units to obtain an audio feature sequence of the target audio file and an audio feature sequence of the to-be-recognized audio file;

performing feature learning on the audio feature sequence of the target audio file and the audio feature sequence of the to-be-recognized audio file by using Siamese neural network, to obtain a feature vector corresponding to the target audio file and feature vectors respectively corresponding to the plurality of audio units in the to-be-recognized audio file; and recognizing, by using an attention mechanism-based machine learning model, the audio units belonging to the target speaker in the to-be-recognized audio file based on the feature vector corresponding to the target audio file and the feature vectors respectively corresponding to the plurality of audio units in the to-be-recognized audio file.

* * * * *